United States Patent
Chuang

(10) Patent No.: US 7,809,504 B2
(45) Date of Patent: Oct. 5, 2010

(54) POWER MANAGEMENT METHOD

(75) Inventor: Chung-Hsien Chuang, Taoyuan (TW)

(73) Assignee: Mitac International Corporation, Taoyuan (TW)

( * ) Notice: Subject to any disclaimer, the term of this patent is extended or adjusted under 35 U.S.C. 154(b) by 938 days.

(21) Appl. No.: 11/622,375

(22) Filed: Jan. 11, 2007

(65) Prior Publication Data
US 2007/0162227 A1 Jul. 12, 2007

(30) Foreign Application Priority Data
Jan. 12, 2006 (TW) .............................. 95101158 A

(51) Int. Cl.
*G06F 11/30* (2006.01)
(52) U.S. Cl. ........................................ 701/213; 703/18
(58) Field of Classification Search ................. 701/213; 713/320, 300, 310, 322, 324, 340; 455/574, 455/553.1, 572, 95; 700/286, 291, 295, 297; 703/18–22; 702/57, 60–65, 122, 188
See application file for complete search history.

(56) References Cited

U.S. PATENT DOCUMENTS

| 7,010,438 B2 * | 3/2006 | Hancock et al. ............... 702/60 |
| 7,132,763 B2 * | 11/2006 | Rendic ......................... 307/31 |
| 7,460,891 B2 * | 12/2008 | Koch et al. ................... 455/574 |

* cited by examiner

*Primary Examiner*—Dalena Tran

(57) ABSTRACT

A power management method is applicable to an electronic device having GPS navigation software and a GPS module for executing the navigation software. First, the data storage power (i.e. the RTC power) is enabled when the electronic device is powered on, and whether the electronic device receive an external power is detected; if yes, the master power (i.e. the RF power) is enabled and the GPS module is enabled to perform an initialization process and continue detecting whether the electronic device receives an external power; it no, the master power is disabled and detecting whether the electronic device receives an external power continues. Compared with the prior art, the power management method of the present invention, by managing powers installed in the electronic device and corresponding to the GPS module, increases the possibility for the navigation software to enter the hot start mode, and advances user's convenience.

22 Claims, 1 Drawing Sheet

POWER MANAGEMENT METHOD

BACKGROUND OF THE INVENTION

1. Field of the Invention

This invention relates to power management methods, and more particularly, to a power management method applicable to an electronic device having a global position system (GPS) navigation software and a GPS module for executing the navigation software.

2. Description of Related Art

In general, an electronic device such as a personal digital assistant (PDA), if equipped with a global position system (GPS) navigation software, comprises a GPS module corresponding to the navigation software. However, the GPS module can neither receive working powers nor work normally if the navigation software is off. The working powers include a real time clock (RTC) power and a radio frequency (RF) power.

The navigation software is actuated in two modes—one is a hot start mode, which takes only a few seconds to actuate the navigation software to work normally; the other is a cold start mode, which, however, takes as long as tens of seconds to actuate the navigation software to work normally. The selection of the hot start mode is determined according to how often a user uses the navigation software. In practice, if the user just has actuated the navigation software to enter a satellite positioning process and plans to actuate the navigation software again, the hot start mode is recommended. However, if the navigation software is off for a long time, say, two hours, the navigation software cannot be actuated unless it is actuated in the cold start mode, which takes time.

An assisted GPS (AGPS) technology is introduced to the market to increase the time for satellite positioning. However, the AGPS needs additional hardware and is expensive.

Therefore, how to provide a technical resolution, which increases the possibility of hot start, advances user's convenience, does not any additional hardware, and decreases the cost, has becoming one of the most important issues in the art.

SUMMARY OF THE INVENTION

In views of the above-mentioned problems of the prior art, it is a primary objective of the present invention to provide a power management method to increase the possibility of hot start selected.

It is another objective of the present invention to provide a power management method to advance user's convenience.

It is a further objective of the present invention to provide a power management method, which does not need any hardware installed.

It is still another objective of the present invention to provide a low-cost power management method.

To achieve the above-mentioned and other objectives, a power management method is provided according to the present invention. The power management method is applicable to an electronic device having global position system (GPS) navigation software and a GPS module for executing the navigation software. Powers installed in the electronic device and corresponding to the GPS module include a data storage power and a master power, and the GPS is in a non-working state. The power management method first enables the data storage power while the electronic device is powered on, and then detects whether the electronic device receives an external power; if yes, enable the master power and enable GPS module to perform an initialization process, and continue detecting whether the electronic device receives an external power; if no, disable the master power and continue detecting whether the electronic device receives an external power.

Compared with the prior art, the power management method of the present invention, by managing powers installed in the electronic device and corresponding to the GPS module, increases the possibility for the navigation software of the electronic device to enter the hot start mode, and advances user's convenience.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
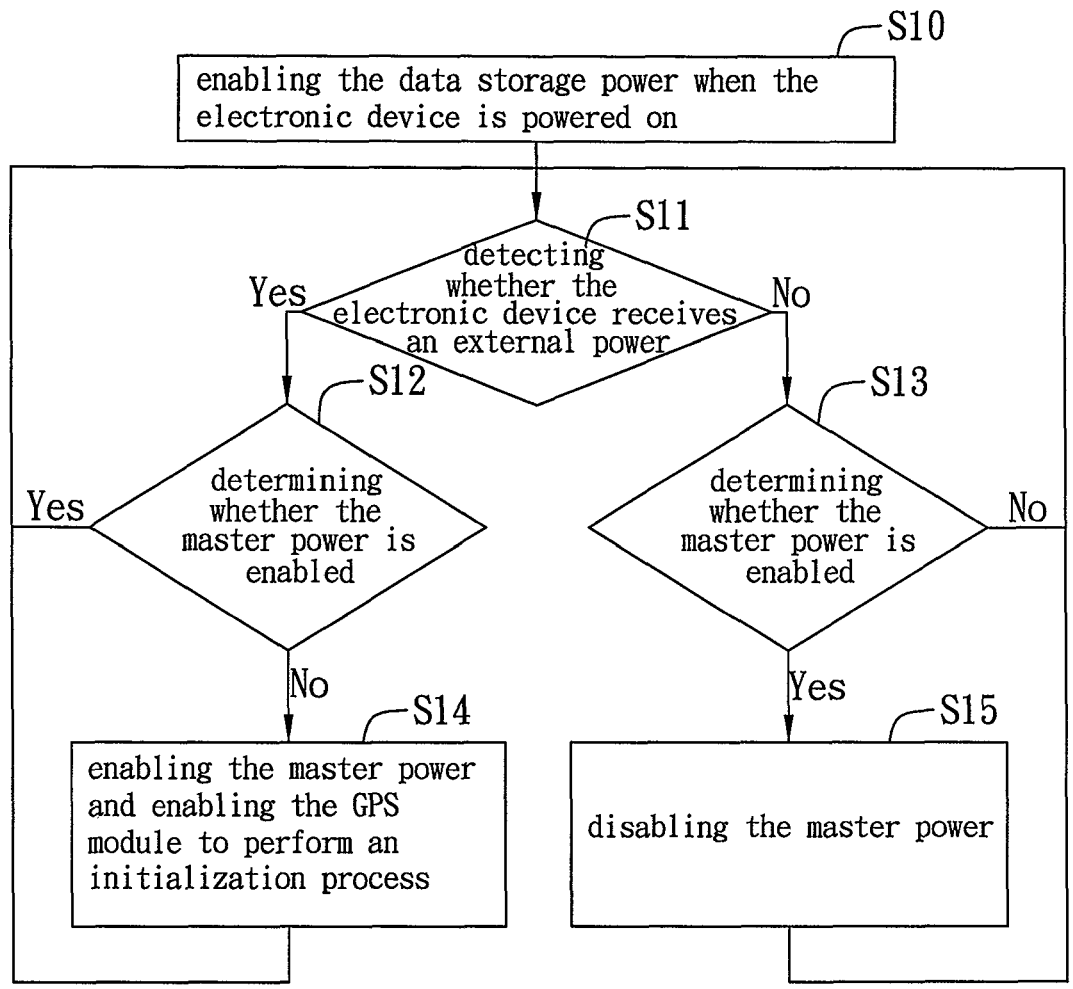
FIG. 1 is a flow chart of a power management method of the preferred embodiment according to the present invention.

The following illustrative embodiments are provided to illustrate the disclosure of the present invention, these and other advantages and effects can be apparently understood by those in the art after reading the disclosure of this specification. The present invention can also be performed or applied by other different embodiments. The details of the specification may be on the basis of different points and applications, and numerous modifications and variations can be devised without departing from the spirit of the present invention.

FIG. 1 is a flow chart of a power management method of the preferred embodiment according to the present invention. The power management method is applicable to an electronic device having a global position system (GPS) navigation software and a GPS module for executing the navigation software. Powers installed in the electric device and corresponding to the GPS include a data storage power and a master power. The GPS module is in a non-working state (that is none of the software in the electronic device is using the GPS module). According to the preferred embodiment, the electronic device is a portable electronic device, such as a personal digital assistant (PDA), a pocket PC (PPC) or a cellular phone. The data storage power means a real time clock (RTC) power, and the master power means a radio frequency (RF) power. The RTC power is used for keeping data stored in a memory unit of the GPS module, while the RF power is used for providing power to other elements such as an antenna not consuming the power provided by the RTC power.

The method includes steps S10 to S15.

In step S10, a data storage power set is enabled for the GPS module when the electronic device is powered on. Step S10 means that as long as the electronic device is powered on, the data storage power, that is the RTC power, is enabled. For example, if the electronic device is a PDA embedded with the GPS navigation software, the RTC power is enabled when the PDA is powered on, no matter the navigation software is executed or off. In step S10, the RTC power is enabled, and the GPS module can then calculate ephemeris data collected recently and store important data in the memory unit such as an SDRAM of the GPS module. Therefore, when the navigation software is actuated, the GPS module can use the data stored in the memory unit to assist the satellite positioning process. In a such way, the possibility for the navigation software (when actuated) to enter the hot start is increased. Further, because the RTC power consumes less power, the electronic device consumes less power accordingly. Step S11 is then proceeded.

In step S11, whether the electronic device receives an external power is detected; if yes, go to step S12, or else go to S13. According to the preferred embodiment, the external power is an AC power. For example, if the electronic device is a PDA embedded with the GPS navigation software, S11 detects whether the PDA has an external charger, such as a car charger and a travel charger.

In step S12, whether the master power (i.e. the RF power) is enabled is determined; if yes, return to step S11 to continue detecting whether the electronic device receives an external power, or else go to step S14.

In step S14, the master power (i.e. the RF power) enabled and the GPS module is enabled to perform an initialization process; then return to step S11 to continue detecting whether the electronic device receives an external power. According to the preferred embodiment, enabling the GPS module to perform an initialization process is to reset the GPS module. In other words, the GPS performs the initialization process prior to the satellite positioning process. An objective of Step S14 is enabling the RF power, which is the most power-consuming element in the electronic device, while the electronic device receives the external power, and allowing the GPS module to start to work. Therefore, the navigation software can be actuated in the hot start mode and work normally.

In step S13, whether the master power (i.e. the RF power) is disabled is determined; if no, return to step S11 to continue detecting whether the electronic device receives an external power.

In step S15, the master power (i.e. the RF power) is disabled, returning to step S11 to continue detecting whether the electronic device receives an external power. An objective of step S15 is that the RF power, which is the most power-consuming element in the electronic device, is off, while the electronic device does not receive any external power (encountering a power shortage problem), and the GPS module therefore stops working. However, because the RTC power is still enabled while the electronic device is powered on, the GPS module can still calculate ephemeris data collected recently and store important data in the memory unit of the GPS module, so that the possibility for the navigation software, when actuated, to enter the hot start mode is increased.

In summary, the power management method of the present invention is applied to non-working GPS module. First, the data storage power (i.e. the RTC power) is enabled when the electronic device is powered on, and whether the electronic device receive an external power is detected; if yes, the master power (i.e. the RF power) is enabled and the GPS module is enabled to perform an initialization process and continue detecting whether the electronic device receives an external power; if no, the master power is disabled and detecting whether the electronic device receives an external power continues. Compared with the prior art, the power management method of the present invention, by managing powers installed in the electronic device and corresponding to the GPS, increases the possibility for the navigation software of the electronic device to enter the hot start mode, and advances user's convenience.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. A power management method applicable to an electronic device having a global positioning system (GPS) module, the power management method comprising the following steps of:
   (1) enabling a data storage power set for the GPS module when the electronic device is powered on;
   (2) detecting whether the electronic device receives an external power; if yes, go to step (3), or else go to step (4);
   (3) enabling a master power set for the GPS module and enabling the GPS module to perform an initialization process, and returning to step (2); and
   (4) disabling the master power, and returning to step (2).

2. The power management method of claim 1, wherein the electronic device is a portable electronic device.

3. The power management method of claim 2, wherein the portable electronic device is a personal digital assistant (PDA).

4. The power management method of claim 2, wherein the portable electronic device is a pocket personal computer (PPC).

5. The power management method of claim 2, wherein the portable electronic device is a cellular phone.

6. The power management method of claim 2, wherein the data storage power is a real time clock (RTC) power.

7. The power management method of claim 2, wherein the master power is a radio frequency (RF) power.

8. The power management method of claim 1, wherein in step (2) the electronic device is periodically detected whether the external power is received.

9. The power management method of claim 1, wherein external power is an alternate current (AC) power.

10. The power management method of claim 1 further comprising a step of determining whether the master power is enabled before step (3); if yes, return to step (2), or else execute step (3).

11. The power management method of claim 1, wherein in step (3) enabling the GPS module to perform an initialization process is to reset the GPS module.

12. The power management method of claim 1 further comprising a step of determining whether the master power is disabled before step (4); if yes, execute step (4), or else return to step (2).

13. A power management method applicable to an electronic device having a GPS module, the power management method comprising the following steps of:
   (1) enabling a data storage power set for the GPS module when the electronic device is powered on;
   (2) detecting whether the electronic device receives an external power; if yes, go to step (3), or else go to step (4);
   (3) determining whether a master power set for the GPS module is enabled; if yes, return to step (2), or else enable the master power, enable the GPS module to perform an initialization process, and return to step (2); and
   (4) determining whether the master power is enabled; if yes, disable the master power and return to step (2), or else return to step (2).

14. The power management method of claim 13, wherein the electronic device is a portable electronic device.

15. The power management method of claim 14, wherein the portable electronic device is a PDA.

16. The power management method of claim 14, wherein the portable electronic device is a PPC.

17. The power management method of claim 14, wherein the portable electronic device is a cellular phone.

18. The power management method of claim 13, wherein the data storage power is an RTC power.

19. The power management method of claim 13, wherein the master power is an RF power.

20. The power management method of claim 13, wherein the external power is an AC power.

21. The power management method of claim 13, wherein in step (2) the electronic device is periodically detected whether the external power is received.

22. The power management method of claim 13, wherein in step (3) enabling the GPS module to perform an initialization process is to reset the GPS module.

* * * * *